July 29, 1958  B. J. HEIKEN  2,845,167
AUGER CONVEYOR HAVING TELESCOPING CHARACTERISTICS
Filed Oct. 25, 1956
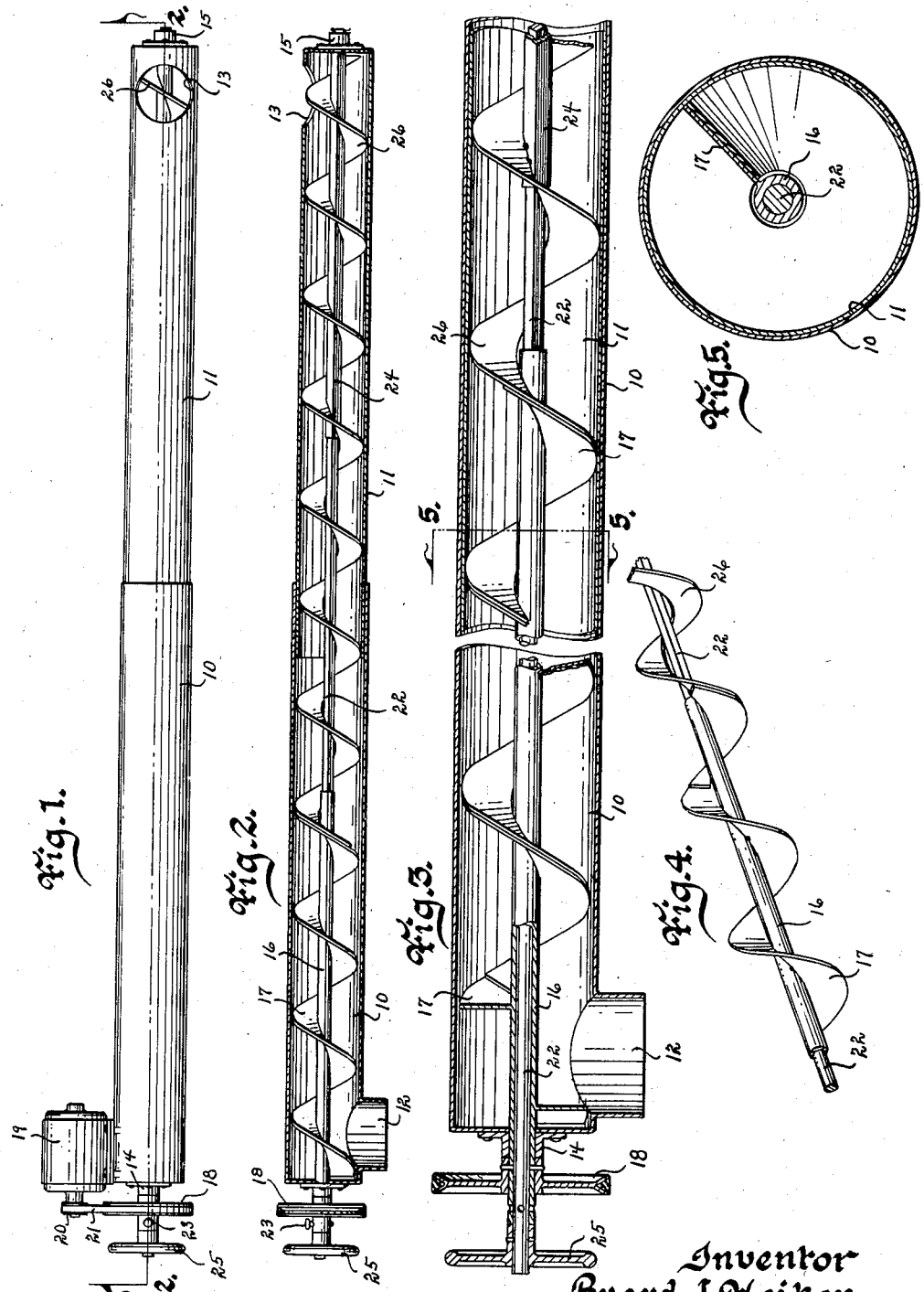
Inventor
Byard J. Heiken
by M. Talbert Dick
Attorney
Witness
Edward P. Seeley

United States Patent Office 2,845,167
Patented July 29, 1958

2,845,167

AUGER CONVEYOR HAVING TELESCOPING CHARACTERISTICS

Byard J. Heiken, Atlantic, Iowa

Application October 25, 1956, Serial No. 618,216

4 Claims. (Cl. 198—213)

This invention relates to material conveyors and, more particularly, to the auger type.

Conveyors for moving materials such as granular products, agriculture grains, farm silage, and like, are very old. One of the most used is the auger type wherein the auter is rotated inside a tube or cylindrical sleeve. The chief objection to this conveyer or elevator means, however, is that its length is fixed. In many instances, either a longer or shorter one is required to accomplish a given task. Also, during an operation, it may be advantageous to either elongate or shorten the conveyor. Furthermore, during the setting up of a conveyor for a job, it may be desirable to first secure one end into the material to be moved with the device shortened, and then extend it to the point where the material is to be moved. Such lengthening or shortening of present auger type conveyors is impossible. Therefore, one of the principal objects of my invention is to provide an auger conveyor that may be easily and quickly changed as to length.

A further object of this invention is to provide a length adjustable auger conveyor that is easily transported from location to location.

A still further object of my invention is to provide an adjustable auger conveyor that uses its own auger means to accomplish its extension or contraction.

Still further objects of this invention are to provide a length adjustable auger conveyor that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my conveyor in extended condition,

Fig. 2 is a longitudinal sectional view of the device taken on line 2—2 of Fig. 1 and more fully illustrates its construction, Fig. 3 is an enlarged longitudinal sectional view of my conveyor in shortened condition, Fig. 4 is a perspective view of the auger portion, and Fig. 5 is an enlarged cross sectional view of the device taken on line 5—5 of Fig. 3.

In these drawings, I have used the numerals 10 and 11 to designate the two telescoping cylindrical tubes, respectively, each having its outer end closed. The cylinder 10 has the inlet or outlet part 12 in its outer end portion and the cylinder 11 has the inlet or outlet part 13 in its outer end portion. The numeral 14 designates a bearing member on the outer end of the cylinder 10. The numeral 15 designates a bearing member on the outer end of the cylinder 11. Rotatably journalled through the bearing 14, and extending into the cylinder 10, is a pipe shaft 16. The numeral 17 designates a section of a spiral auger on the shaft 16 and in the cylinder 10. The numeral 18 designates a pulley wheel secured on the pipe shaft 16 and at the outside of the outer end of the pipe 10, as shown in Fig. 3. The numeral 19 designates a source of power such as an internal combustion engine, an electric motor, or like, and having a drive pulley wheel 20 on its shaft. The numeral 21 designates an endless belt embracing the pulley wheels 18 and 20. The numeral 22 designates a shaft journalled through the pipe shaft 16. The numeral 23 designates a removable pin adjacent the outer side of the pulley wheel 18 and extending through the pipe shaft 16 and shaft 22. This shaft 22 becomes rectangular in cross section as it leaves the inner end of the pipe shaft 16. The numeral 24 designates a pipe shaft journalled in the bearing 15 and extending into the cylinder 11. The interior of this shaft 24 is rectangular in cross section to slidably embrace the inner end portion of the rectangular shaft 22. The numeral 25 designates a wheel lever or like on the outer end of the shaft 22. The numeral 26 designates a spiral auger having its outer end portion embracing the pipe shaft 24 and secured thereto. This auger 26 loosely embraces the rectangular portion of the shaft 22 and is capable of also loosely embracing a considerable portion of the pipe shaft 16, as shown in Fig. 3. The shaft 24 is rotatable in the cylinder 11, but is not longitudinally slidable therewith. While I show the inner end portion of the shaft 22 rectangular in cross section, it may be of round construction except its extreme free end that is inside the pipe shaft 24.

The practical operation of the invention is as follows: With the pin 23 in place, the motor will rotate both the pipe shaft 16 and shaft 22 as a unit. Inasmuch as the square end of the pipe 22 slidably extends into the pipe shaft 24, the pipe shaft 24 will also rotate with the pipe shaft 16. As the auger 17 is secured to the pipe shaft 16 and the auger 26 is secured to the pipe shaft 24, both augers will rotate inside the cylinders 10 and 11 and move material in the usual way. The inner end of the auger 17 and the inner end of the auger 26 mesh with each other, as shown in Fig. 2. To adjustably shorten or contract the conveyor, the pin 23 is temporarily removed, the pulley wheel 18 held against rotation and the wheel 25 manually rotated. If the wheel 25 is rotated in one direction with the pipe shaft 16 and auger 17 stationary, the pipe shaft 24 and auger 26 will be rotated. With the two augers in mesh, the auger 26 will screw itself into the auger 17, thereby accordingly contracting or shortening the device's auger means. This adjustable contraction is shown in Fig. 3. If the wheel 25 is rotated in the opposite direction, the auger 26 will accordingly unscrew itself from the auger 17, thereby elongating the device's auger means, as shown in Fig. 2. Thus, the length of the device may be easily adjusted. As the two augers 17 and 26 move toward each other, or away from each other, the sleeve cylinders 10 and 11 will telescope together or slide outwardly relative to each other. The reason for this is that the auger 17 is rotatable but not slidable in the cylinder 10, and the auger 26 is rotatable, but not slidable, in the cylinder 11.

After the device has been adjusted to the desired length, the key pin 23 is replaced and the conveyor used in the usual manner.

Some changes may be made in the construction and arrangement of my auger conveyor having telescoping characteristics without departing from the real spirit and purpose of my invention, and it is my intention to cover by my claims, any modified forms of structure or use of mechanical equivalents which may be reasonably included within their scope.

I claim:

1. In a conveyor, a cylinder having a material part, a second cylinder having a material part and telescoping with said first cylinder, a pipe shaft rotatably non-slidably mounted in said first cylinder, an auger on said pipe shaft and inside said first cylinder, a pipe shaft rotatably non-slidably mounted in said second cylinder, an auger on said last mentioned pipe shaft and inside said second cylinder; said two augers having their free ends capable of meshing with each other, a power means for rotating said first mentioned pipe shaft, a shaft rotatably mounted in said first pipe shaft and slidably non-rotatably mounted in said second pipe shaft, a releasable means for securing said last mentioned shaft to said first pipe shaft, and a manual means for rotating said last mentioned shaft when said releasable means is not functioning to secure said last mentioned shaft to said first pipe shaft.

2. In a conveyor, a cylinder having a material part, a second cylinder having a material part and telescoping with said first cylinder, a pipe shaft rotatably non-slidably mounted in said first cylinder, an auger on said pipe shaft and inside said first cylinder, a pipe shaft rotatably non-slidably mounted in said second cylinder, an auger on said last mentioned pipe shaft and inside said second cylinder; said two augers having their free ends capable of meshing with each other, a power means for rotating said first mentioned pipe shaft, a shaft rotatably mounted in said first pipe shaft and slidably non-rotatably mounted in said second pipe shaft, a releasable means for securing said last mentioned shaft to said first pipe shaft, and a manual means for rotating said last mentioned shaft when said releasable means is not functioning to secure said last mentioned shaft to said first pipe shaft; said second auger extending beyond said second pipe shaft to loosely embrace said first pipe shaft.

3. In a conveyor, a cylinder having a material part, a second cylinder having a material part and telescoping with said first cylinder, a pipe shaft rotatably non-slidably mounted in said first cylinder, an auger on said pipe shaft and inside said first cylinder, a pipe shaft rotatably non-slidably mounted in said second cylinder, an auger on said last mentioned pipe shaft and inside said second cylinder; said two augers having their free ends capable of meshing with each other, a power means for rotating said first mentioned pipe shaft, a shaft rotatably mounted in said first pipe shaft and slidably non-rotatably mounted in said second pipe shaft, a releasable means for securing said last mentioned shaft to said first pipe shaft, and a manual means for rotating said last mentioned shaft when said releasable means is not functioning to secure said last mentioned shaft to said first pipe shaft; said two pipe shafts having their adjacent inner ends spaced apart from each other.

4. In a material conveyor, two telescoping cylinders, each having a material passageway part, an auger rotatably non-slidably mounted in one of said cylinders, a second auger rotatably non-slidably mounted in the other said cylinder; said two augers having their adjacent ends in mesh with each other, a releasable means for securing said two augers against independent rotation, a manual means extending to the outer end of one of said cylinders for rotating one of said augers independent of the other said auger when said releasable means is not functioning for securing said two augers against independent rotation, and a means for rotating the other said auger.

References Cited in the file of this patent
UNITED STATES PATENTS
2,292,934   Fitch _____ Aug. 11, 1942